April 29, 1930.  C. A. GILL ET AL  1,756,119
PUNCHING MACHINE
Filed Dec. 22, 1927  6 Sheets-Sheet 1
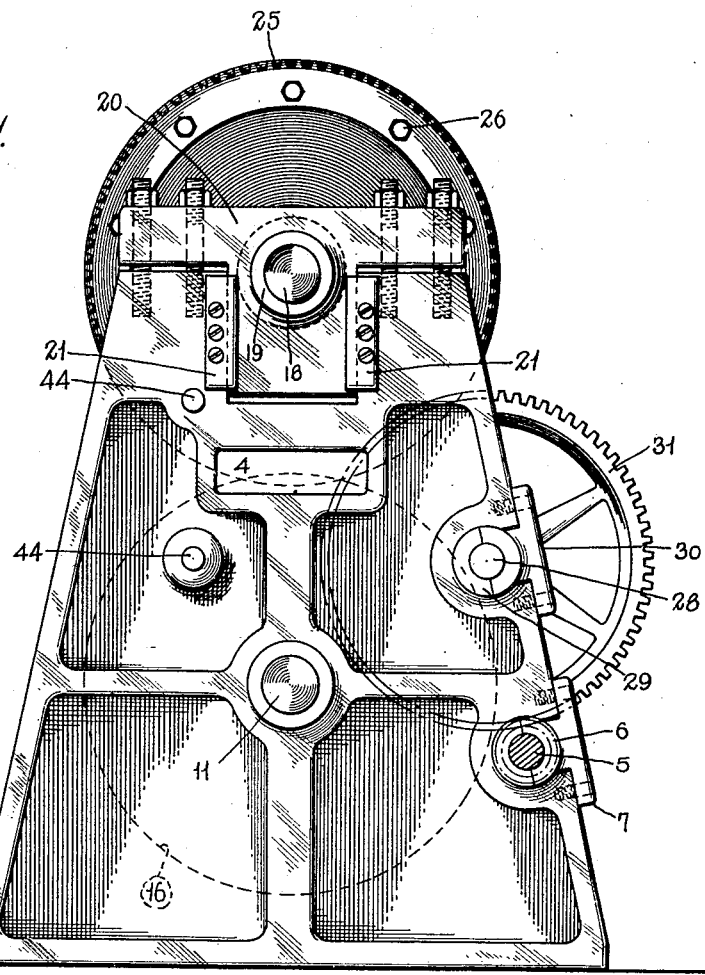
INVENTORS
Charles A. Gill
Frank J. Ley, Jr.
BY
ATTORNEY.

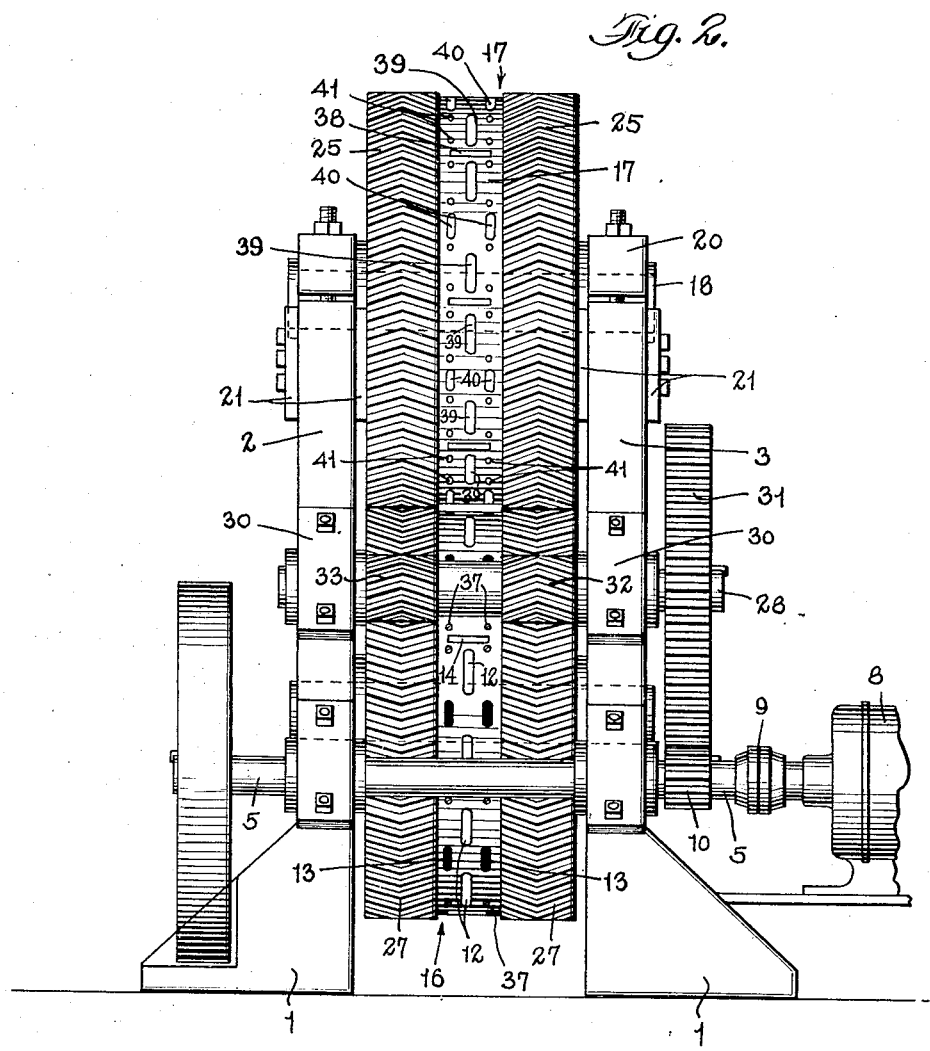

April 29, 1930.　　　C. A. GILL ET AL　　　1,756,119
PUNCHING MACHINE
Filed Dec. 22, 1927　　　6 Sheets-Sheet 3

INVENTORS
Charles A Gill
Frank J Gey, Jr.
BY
Gavin A Clarkson
ATTORNEY.

April 29, 1930.  C. A. GILL ET AL  1,756,119
PUNCHING MACHINE
Filed Dec. 22, 1927    6 Sheets-Sheet 4
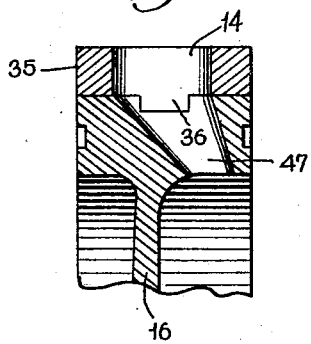
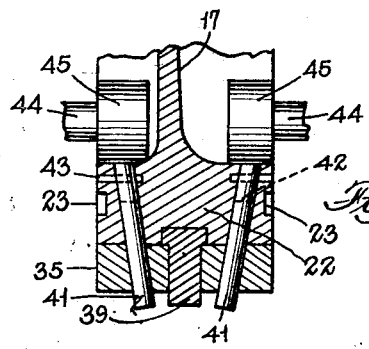
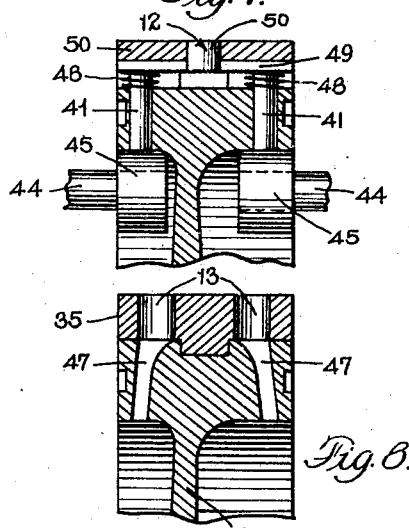
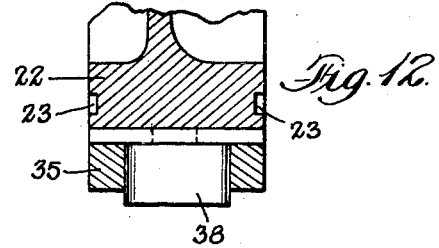
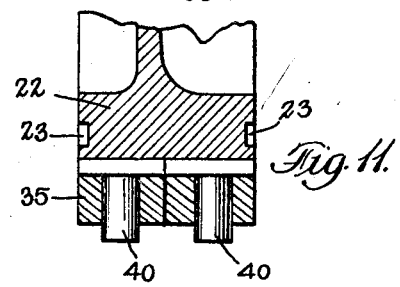
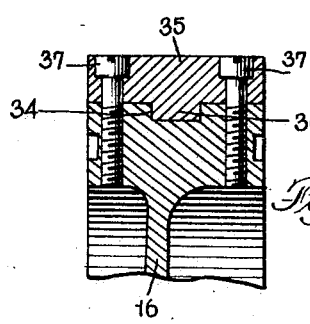
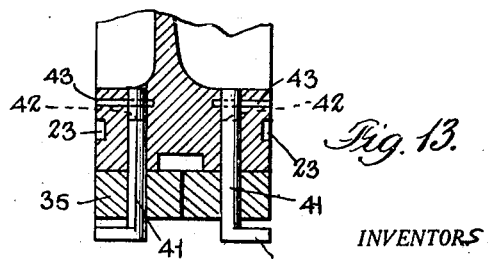

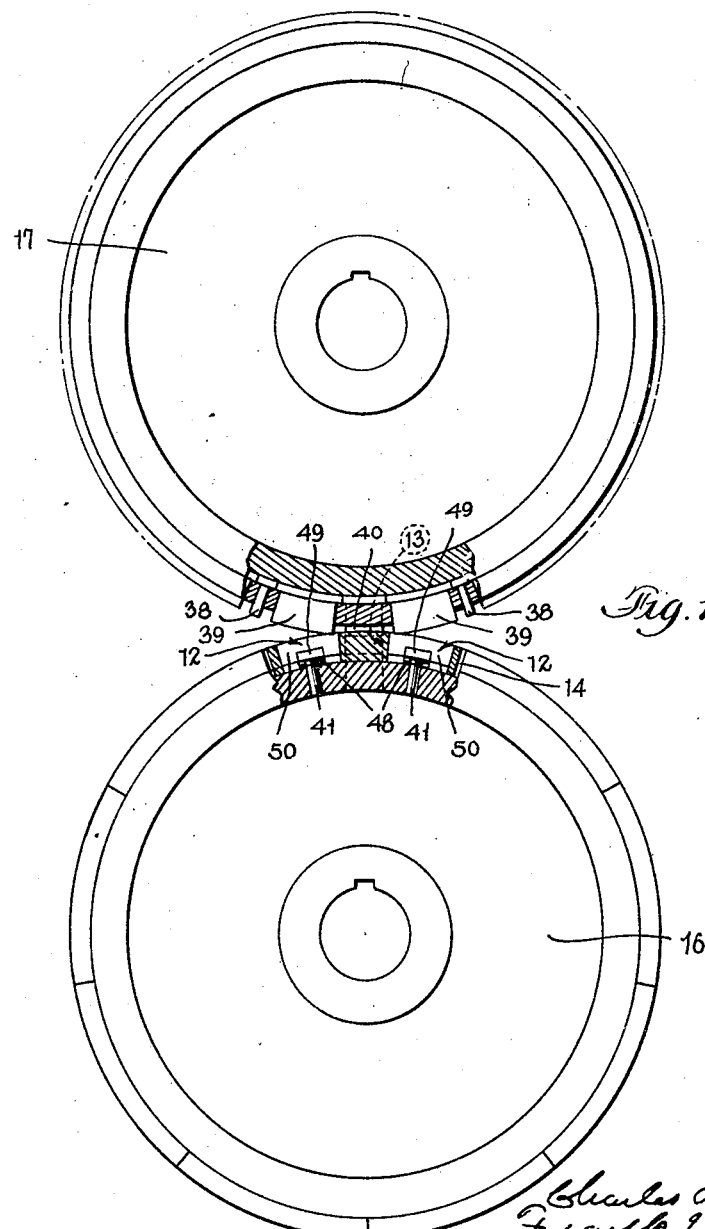

Patented Apr. 29, 1930

1,756,119

UNITED STATES PATENT OFFICE

CHARLES A. GILL, OF BALTIMORE, MARYLAND, AND FRANK J. GEY, JR., OF PITTSBURGH, PENNSYLVANIA

PUNCHING MACHINE

Application filed December 22, 1927. Serial No. 241,901.

While our machine is shown as being equipped to punch brake shoe backs, it will, of course, be understood that it is adapted to punch out various shapes from any material providing, of course, they are flat or semi-flat materials, by designing the dies, punches and strippers to produce the desired article.

As stated, the dies shown are designed and arranged to produce brake shoe backings, as used on brake shoes of cars and locomotives. The dies are so arranged that they will punch the backs out and cut them off to length. There are, preferably, nine dies and a set of punches for each die. The dies are located in the lower roll and the punches in the upper roll.

One complete revolution turns out nine backs and the machine making twenty-two revolutions per minute delivers 198 backs per minute. This is approximately seven times faster than the present method.

In the drawings:

Figure 1 is a side elevation of our improved machine.

Figure 2 is a front elevation of Figure 1.

Figure 6 is a sectional view on the line 6—6, Figure 5.

Figure 7 is a sectional view on the line 7—7, Figure 5.

Figure 8 is a sectional view on the line 8—8, Figure 5.

Figure 9 is a sectional view on the line 9—9, Figure 5.

Figure 10 is a sectional view on the line 10—10, Figure 4.

Figure 11 is a sectional view on the line 11—11, Figure 4.

Figure 12 is a sectional view on the line 12—12, Figure 4.

Figure 13 is a sectional view on the line 13—13, Figure 4.

Figure 14 is a perspective view of the brake shoe back produced by our machine.

Figure 15 is a side elevation of the die and punch rolls, detached, parts being in section.

Figure 3:
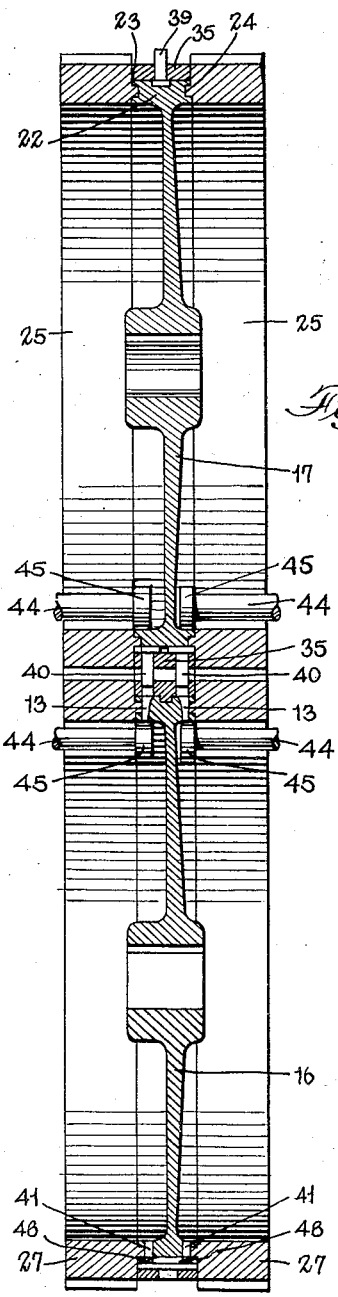
Figure 3 is a vertical section of the punch and die rolls.
Figure 4:
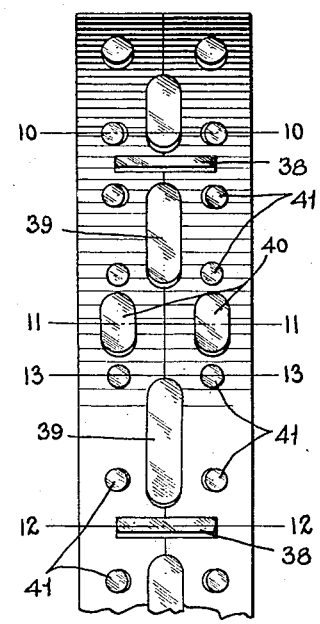
Figure 4 is an enlarged fragmentary view of the face of the punch roll and punches.
Figure 5:
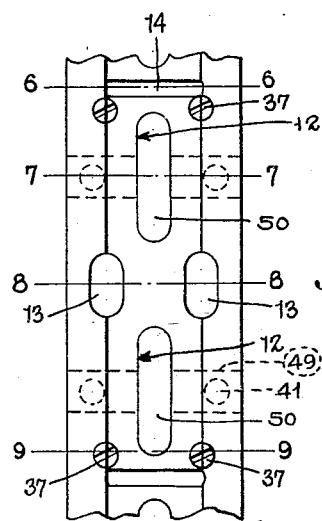
Figure 5 is a similar view of the die roll and dies.
Figure 16:
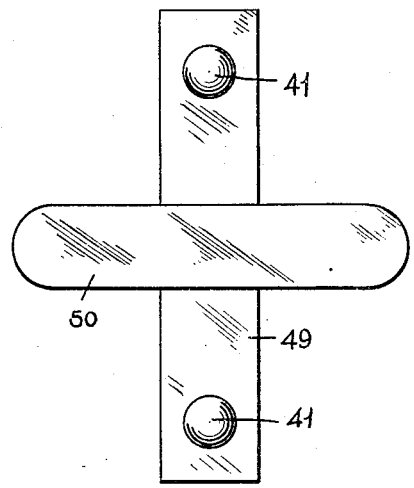
Figures 16, 17, 18, are detail views of the stripping pins.
Figures 17, 18:
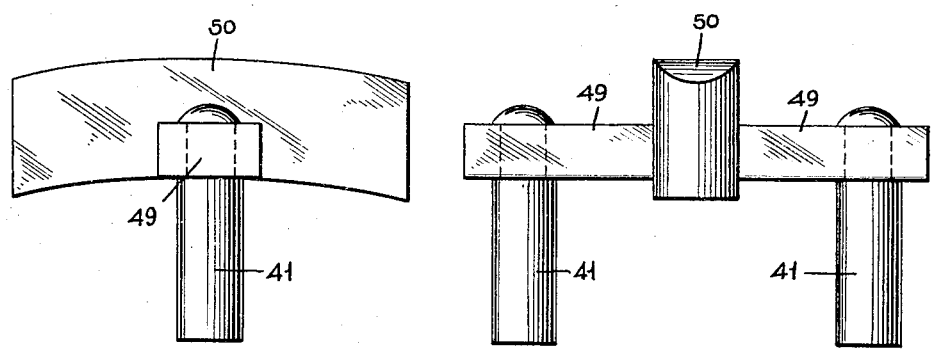

The frame of the machine includes a base 1 which supports the pedestals 2, 3, which are spaced from each other as clearly shown in Figure 2, each of which is provided with an elongated opening 4 to facilitate the checking of the timing of the rolls.

A motor drive and fly wheel shaft 5 is journalled in the pedestals in suitable bearings 6 having caps 7. A motor 8 is connected to the shaft 5 by means of a semi-flexible shaft coupling 9, there being a main driving pinion spur gear 10 keyed to the shaft 5.

A female die wheel 16 is keyed to the shaft 11, and is provided with the female dies 12, 13 and 14. The dies herein shown are designed to produce the brake shoe backs 15 shown in Figure 14.

A male die wheel 17 is keyed to the shaft 18 which is journalled in the bearing 19 at the top of the pedestals, which bearing has a removable cap 20, said caps 20 having guides 21 to hold and guide the caps in place.

The side faces of the rim 22 of the male die wheel are provided with annular grooves 23 to receive the annular tongue 24 which projects from the inner face of the rim portion of the forged steel herring-bone ring gears 25, the gears 25 being held in place on each side of the die wheel 17 by means of screws 26.

The herring-bone ring gears 27 are secured to the female die wheel 16 in the manner just described in connection with the gears 25.

A shaft 28 is mounted on the pedestals in a bearing 29 provided with a cap 30, said shaft having keyed thereto a spur gear 31 which is in mesh with the main driving pinion spur gear 10. Two herring-bone gears 32, 33, are keyed to the shaft 28 in spaced relation and mesh with the herring-bone gear rings 27 on the female die wheels whereby power is applied to the gear rings 27 and through them to the ring gears 25 on the male die wheel.

The die wheels are each provided with an annular groove 34 in their peripheries. The die member 35 is provided on its under side with a tongue 36 which is seated in the groove 34, said die members being securely held in place by means of screws 37. On the male rings, 38, 39, 40, are the punching dies, the die 38 being a shearing punch to cut the brake shoe backs 15 off at the proper length.

Referring to Figure 10, it will be seen that stripping pins 41 are slidably mounted in suitable ways in the die segment rings 35 and the ring 22 of the die wheel 17, said ways opening at one end through the under face of the rim 22. These stripping pins are each provided with elongated slots 42 (shown in dotted lines in Figures 10 and 13) adapted to receive screwed dowel pins 43. The stripping pins 43 are guided and their stripping action is controlled by these oblong slots 42.

Stripper shafts 44 are suitably journalled in the pedestals and are provided with stripper rolls 45, the shafts 44 being conveniently located so as to allow the stripping rolls 45 to travel on the inner surface of the rim of the male and female die wheels. These stripping rolls and shafts are not assembled until all other parts of the machine are in place ready for operation. Some of the stripping pins 41 are provided with wings 46 to take care of the comparatively long piece cut by the punch 39.

Referring to the female dies, it will be noted that there are slots 47 machined through the rim of wheel 16. These are made large enough so that punched slugs may pass freely out of the female dies.

The stripper pins 41 are provided with coiled springs 48, one end of which is in contact with the under face of ears 49, and the other end in contact with the face of the run of the wheel 16; the function of these springs being to assist the stripping rolls 45, when slug stripper 50 is in the action of removing a slug from the slot 12.

What we claim is:

1. In a machine of the character described a die wheel comprising a rim having a peripheral groove coextensive with its periphery and centrally disposed with reference to the sides of the rim, annular grooves on each side of said rim, a die strip disposed on the periphery of said member having a tongue projecting into the peripheral groove of the rim, and ring gears disposed on each side of the rim having tongues extending into said side grooves.

2. In a rotary punch press, coacting male and female die wheels, each embodying a central web and a rim projecting beyond opposite sides of the web, the lateral portions of the rim of the female die wheel having die recesses opening through the outer periphery of the rim and discharge slots for punchings extending inwardly therefrom and opening through the inner periphery of the rim, and the lateral portions of the rim of the male die wheel having die members for cooperation with said slots, radially movable strippers on the rims of the die wheels, the lateral portions of the rims having track surfaces, and rollers running on said track surfaces for periodically operating said strippers.

3. In a rotary punch press, a frame having sides, male and female die wheels disposed between the sides of the frame and each embodying a central web and a rim, the latter projecting beyond opposite sides of the web and having positioning grooves in its outer peripheral and lateral faces, a die ring carried by the rim of each wheel and having a tongue engaging the groove in the periphery of the rim, pairs of ring gears disposed between the sides of the frame and the lateral faces of the rims of the wheels and having tongues engaging the grooves in said lateral faces, the ring gears at like sides of the die wheels being in intermeshing engagement, fastenings detachably connecting the die rings and gears to the rims of the wheels, and a transverse shaft journaled on the sides of the frame and carrying gears meshing with the gears of one of said pairs of ring gears.

4. In a rotary punch press, a die unit comprising a rotary die wheel having a rim, a die ring fastened to the periphery of the die wheel, and ring gears at opposite sides of the die rim and ring and detachably fastened to the sides of the rim.

5. In a rotary punch press, a frame having spaced sides, shafts journaled in the frame sides, male and female die wheels arranged between the frame sides and carried by the shafts, said wheels having rims carrying coacting dies and ring gears at the opposite sides of each wheel rim and secured thereto, the gears at each side of the wheels being in mesh, a transverse shaft on the frame, and gears on said transverse shaft meshing with the ring gears on one of the die wheels.

In testimony whereof we affix our signatures.

CHARLES A. GILL.
FRANK J. GEY, Jr.